(12) United States Patent
Wang

(10) Patent No.: US 10,043,529 B2
(45) Date of Patent: Aug. 7, 2018

(54) AUDIO QUALITY IMPROVEMENT IN MULTIMEDIA SYSTEMS

(71) Applicants: Hisense USA Corp., Suwanee, GA (US); Hisense Electric Co., Ltd., Qingdao, Shandong OT (CN); Hisense International Co., Ltd., Qingdao OT (CN)

(72) Inventor: Wenjie Wang, Suwanee, GA (US)

(73) Assignees: Hisense USA Corp., Suwanee, GA (US); Hisense Electric Co., Ltd., Qingdao, Shandong (CN); Hisense International Co., Ltd., Qingdao, Shandong (CN)

( * ) Notice: Subject to any disclaimer, the term of this patent is extended or adjusted under 35 U.S.C. 154(b) by 0 days.

(21) Appl. No.: 15/199,363

(22) Filed: Jun. 30, 2016

(65) Prior Publication Data
US 2018/0005642 A1    Jan. 4, 2018

(51) Int. Cl.
| | |
|---|---|
| *A61F 11/06* | (2006.01) |
| *G10K 11/16* | (2006.01) |
| *H03B 29/00* | (2006.01) |
| *G10L 21/0208* | (2013.01) |
| *H04R 1/08* | (2006.01) |
| *H04R 29/00* | (2006.01) |
| *H04M 9/08* | (2006.01) |
| *H04S 7/00* | (2006.01) |
| *H04R 1/22* | (2006.01) |

(52) U.S. Cl.
CPC ............ *G10L 21/0208* (2013.01); *H04R 1/08* (2013.01); *H04R 29/001* (2013.01); *G10L 2021/02082* (2013.01); *H04M 9/085* (2013.01); *H04R 1/22* (2013.01); *H04S 7/301* (2013.01)

(58) Field of Classification Search
CPC ....... G10L 21/0208; G10L 2021/02082; H04S 7/301; H04R 1/22; H04R 2201/403; H04R 1/406; H04R 1/08; H04R 29/001; H04R 3/002; H04R 1/26; H04M 9/085; G10K 11/16
USPC ....... 381/66, 307, 71.2, 57, 58, 56, 59, 71.8, 381/71.14
See application file for complete search history.

(56) References Cited

U.S. PATENT DOCUMENTS

| | | | |
|---|---|---|---|
| 2004/0181359 A1* | 9/2004 | Freger | G01S 7/292 702/149 |
| 2006/0093128 A1* | 5/2006 | Oxford | H04M 9/082 379/406.01 |
| 2009/0052677 A1* | 2/2009 | Smith | H04S 7/40 381/56 |
| 2012/0044786 A1* | 2/2012 | Booij | H04B 11/00 367/127 |

(Continued)

*Primary Examiner* — Vivian Chin
*Assistant Examiner* — Ubachukwu Odunukwe
(74) *Attorney, Agent, or Firm* — Brinks Gilson & Lione

(57) ABSTRACT

Methods and systems are disclosed for echo suppression of an input audio signal. A multimedia system and a remote control unit are configured to adaptively and dynamically preform calibration processes for obtaining sets of echo suppression parameters. The sets of echo suppression parameters are used to generate an audio signal from an input audio. When rendered by a speaker, the generated audio signal produces echo-suppressed sound of the input audio signal at one of more locations.

11 Claims, 7 Drawing Sheets

(56) References Cited

U.S. PATENT DOCUMENTS

2013/0230184 A1* 9/2013 Kuech .................. H04M 9/085
 381/66
2015/0016642 A1* 1/2015 Walsh ..................... H04S 7/301
 381/307

* cited by examiner

AUDIO QUALITY IMPROVEMENT IN MULTIMEDIA SYSTEMS

TECHNICAL FIELD

The present disclosure generally relates to the area of audio signal processing and particularly to methods and apparatus for acoustic echo suppression.

BACKGROUND

Human ears are sensitive to artifacts in sound. These artifacts include but are not limited to different types of noises, sampling/digitization/compression artifacts, and echoes. Each of these artifacts originates from different source, may have different correlation with the intended sound, and may thus be filtered or suppressed based on different corresponding technological approaches. For example, noise may be completely random and may be of different "colors" as determined spectrally, e.g., noises may be white, pink, brown, blue, violet, and grey, all with respect to the shape of frequency spectra of the noises. Echoes, particularly acoustic echoes, are sound waves that are correlated with existing intended sound. Because random noises and correlated echoed are of distinct natures, suppression techniques that are applicable to random noise may not be effective against echoes.

Echoes may occur in various forms in different application environments. For example, in a telephone/conference system, echoes may be produced in the far end of a telephone call by transmitting, by the near end terminal, acoustic signal originated from the far end but picked up by a microphone in the near end, to the far-end together with the near end acoustic signal. In a multimedia system having one or more speakers in a large room, such as a conference hall or a movie theater (herein generically referred to as "room"), noticeable echoes may be produced simply by walls or other structures in the room that reflect sound. A typical consumer of multimedia in the modern age often expects artifact-free experience in sound, necessitating a desire to provide acoustic echo reduction for entertainment systems. While special sound absorbing materials may be used for constructing, e.g., a conference room, a movie theater, or a large residential multimedia room, echo suppression may not be adequate based on these mechanical approaches or the construction may be economically infeasible. Thus, it is desirable to reduce echoes in these situations using electronic means, preferably designed into the acoustic and electronic audio devices already equipped in the room.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention.

SUMMARY

Figure 1:
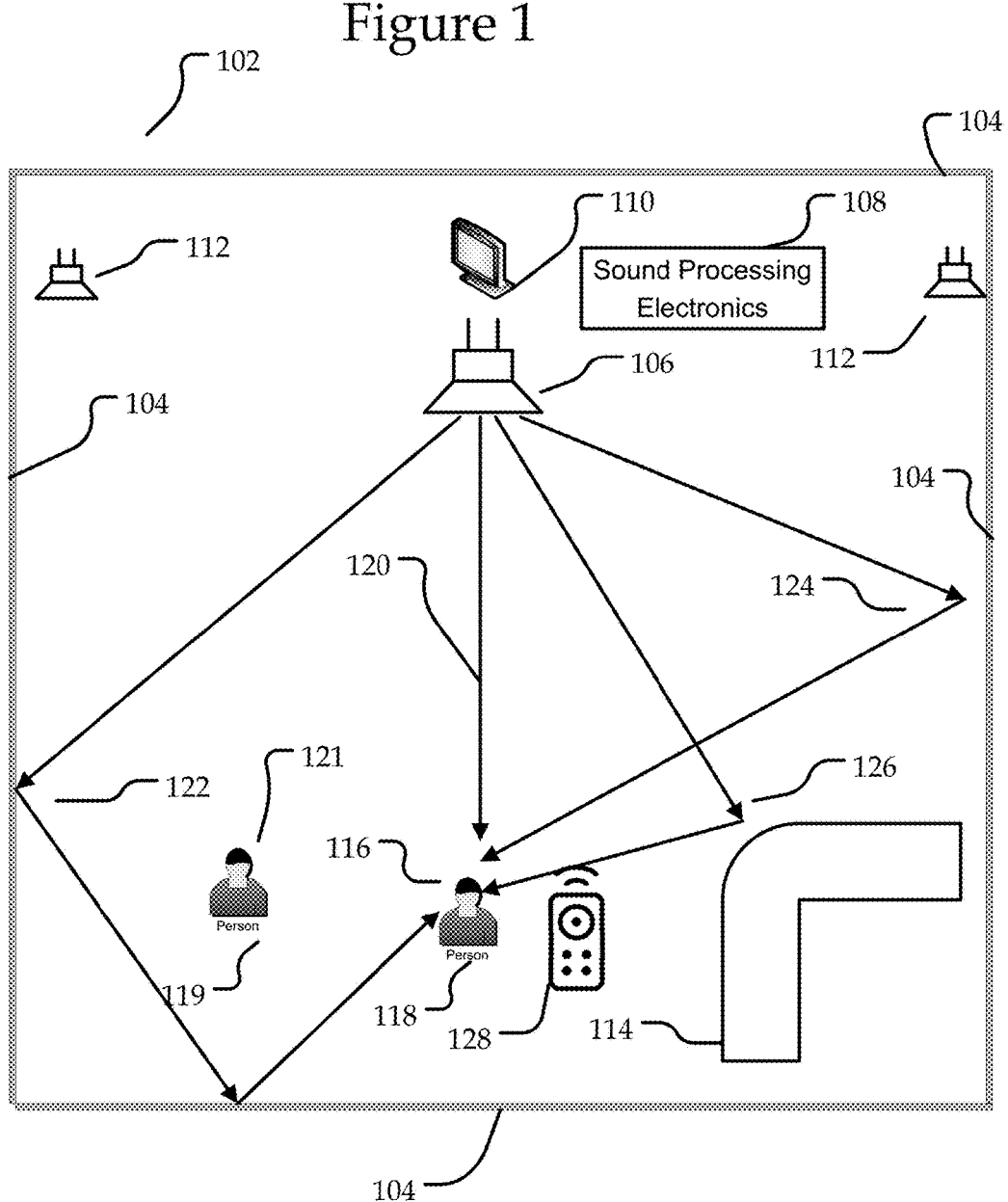
FIG. 1 illustrates an exemplary context and environment applicable to the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides methods and apparatus for suppressing acoustic echoes. In one embodiment, a method for echo suppression in an audio system is disclosed. The method includes: receiving by the audio system a first echo suppression request message; causing, by the audio system, a speaker to generate a first acoustic pulse within a first predetermined time period after receiving the first echo suppression request message, wherein the first acoustic pulse has a pulse width smaller than a first threshold time period and travels along a first direct path and a first set of one or more indirect paths to reach a remote electronic device at a first location; receiving by the audio system a first data message associated with the first echo suppression request message from the remote electronic device containing a first set of data corresponding to a first signal generated by a microphone in the remote electronic device upon detecting by the microphone the first acoustic pulse from the first direct path and from the first set of one or more indirect paths within a second predetermined time period following the detection of the first acoustic pulse from the first direct path by the microphone; storing by the audio system the first set of data in a memory; receiving by the audio system a primary audio signal from a multimedia source; and generating by the audio system an echo suppression audio signal, wherein the echo suppression audio signal is derived from the primary audio signal with a time adjustment, an amplitude adjustment, and a phase shift determined from at least the first set of data.

In another embodiment, a method for echo suppression in a remote electronic device at a first location and in communication with a multimedia system is disclosed. The method includes sending by the remote electronic device a first echo suppression request message to the multimedia system to cause a speaker to generate a first acoustic pulse within a first predetermined time period after receiving the first echo suppression request message, wherein the first acoustic pulse has a pulse width smaller than a first threshold time period and travels along a first direct path and a first set of one or more indirect paths to reach the remote electronic device; generating a first signal by a microphone in the remote electronic device by detecting the first acoustic pulse from the first direct path and from the first set of one or more indirect paths within a second predetermined time period following the detection by the microphone of the first acoustic pulse from the first direct path; deriving by the remote electronic device a first set of data from the first signal; and sending by the remote electronic device a first data message associated with the first echo suppression request message containing the first set of data to the multimedia system.

In another embodiment, an audio system is disclosed. The audio system includes a receiver configured to receive an echo suppression request message and a data message associated with the echo suppression request message from a remote electronic device containing a set of data; a data memory configured to store the set of data; and a digital signal processor configured to cause a speaker of the audio system to generate an acoustic pulse within a first predetermined time period after receiving by the audio system the echo suppression request message, wherein the first acoustic pulse has a pulse width smaller than a threshold time period and travels along a direct path and a set of one or more indirect paths to reach the remote electronic device, to receive a primary audio signal, and to generate an echo suppression signal derived from the primary audio signal with a time adjustment, an amplitude adjustment, and a phase shift determined from at least the set of data; wherein the set of data correspond to a signal generated by a microphone in the remote electronic device upon detecting the acoustic pulse from the direct path and from the set of one or more indirect paths within a second predetermined time period following the detection of the acoustic pulse from the direct path.

In yet another embodiment, a remote electronic device in communication with a multimedia system is disclosed. The remote electronic device includes a transmitter configured to send an echo suppression request message to the multimedia system to cause a speaker to generate an acoustic pulse within a first predetermined time period after the sending of the first echo suppression request message, wherein the first acoustic pulse has a pulse width smaller than a threshold time period and travels along a direct path and a set of one or more indirect paths to reach the remote electronic device, and to send a data message associated with the echo suppression request message containing a set of data to the multimedia system; a microphone configured to generate a signal by detecting the acoustic pulse from the direct path and from the set of one or more indirect paths within a second predetermined time period following the detection of the acoustic pulse from the direct path; and a processor configured to determine the set of data in the data message from the signal generated by the microphone.

DETAILED DESCRIPTION

Embodiments of the invention and the various features and advantageous details thereof are explained more fully with reference to the non-limiting embodiments that are illustrated in the accompanying drawings and detailed in the following description. Descriptions of well-known starting materials, processing techniques, components and equipment are omitted, so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. For example, while some of the embodiments described below situate in residential multimedia environment, the principle disclosed applies to other contexts, such as conference halls, auditoriums, and movie theaters.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. Among other things, for example, subject matter may be embodied as methods, devices, components, or systems. Accordingly, embodiments may, for example, take the form of hardware, software, firmware or any combination thereof (other than software per se).

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A typical multimedia room setting is described in 100 of FIG. 1. The room 102 may be enclosed by walls 104, ceiling, and floor (not shown) that may reflect sound waves with various reflection coefficients. Without losing generality, it is assumed that the reflection at, e.g., the wall 104, changes the direction, amplitude but not the phase of sound waves. To the extent that the phase is modified at the reflection point, a learning procedure may be used to determine, e.g., wall-induced phase change, as will be discussed later in this disclosure. The room may be equipped with a multi-media system that is capable of producing sound through a speaker 106. The Speaker 106 may be connected to a sound processing electronics 108 of the multimedia system. As will be described in more detail later, those of ordinary skill in the art understand that the sound processing electronics may include digital circuits such as a digital signal processor and analogue circuits such as an audio amplifier. The sound processing electronics 108 may obtain audio signal from a multimedia source device 110 of the multimedia system, such as a television set. The audio from the multimedia source device 110 may be digital or may be analog. The audio may be digitally uncompressed or may be compressed using suitable audio codecs. If the audio is coded, the sound processing electronics 108 is responsible for decoding the audio. Other speakers 112 may also be electrically connected to the sound processing electronics and placed throughout the room 102. Each of the speakers 106 and 112 may be a single speaker, or may each be an array of speakers. Those of ordinary skill in the art understand that the sound processing electronics 108 may be standalone equipment, or it may be integrated with the multimedia source device 110. Similarly, the speaker 106 may be standalone or may be integrated with the sound processing electronics 108 and/or the multimedia source device 110 into one self-contained device. The multimedia source device 110, the sound processing electronics 108 may be referred to as the multimedia system or audio system.

The room 102 may contain other sound reflecting objects such as a desk 114. A user 116 may be located at location 118 in room 102. Sound waves (interchangeably referred to as acoustic waves) from, for example, speaker 106 may reach the user through multiple paths. For example, path 120 represents a direct path with shortest travel distance for the sound wave produced by the speaker 106 to reach the user at location 118. The sound wave emitted from the speaker 106 may travel to the left and be reflected twice by the wall 104 before reaching the user 116, as is shown by the path 122. Similarly, the sound wave emitted from the speaker 106 may travel to the right and be reflected once by the wall 104 before reaching the user 116, as is shown by the path 124. Further, the sound wave may be reflected by furniture 114 before reaching the user 116, as is shown by the path 126. The sound paths shown by 120-126 are only for illustrative purposes. Many reflective paths may exist each having any number of reflections off various objects in the room. Some of these reflective paths may form audible acoustic echoes that degrade the quality of the sound perceived by the user 116. Some echo suppression thus may be desired for reducing the perceived echoes by the user 116 at location 118.

Further, the user 116 may choose to sit in any one of various locations at any particular time. Thus the location of the user 118 may not be fixed and may change from time to time. For example, the user may sit at location 118 but may move to location 119 from time to time. Because the reflective paths may be different for location 118 and location 119, suppression of audible echoes at locations 118 and 119 may involve different parameters. Thus, it may be desirable to provide an adaptive echo suppression mechanism for modifying echo suppression parameters quickly as the user moves from location to location in the room.

In addition, there may be multiple users in the room. For example, user 116 may be at location 118 and another user 121 may be at location 119. Both user 116 and 121 may wish to experience echo suppressed audio from the multimedia system. Thus, it is desirable to provide an echo suppression mechanism that helps reduce echoes at multiple locations, e.g., both at location 118 and location 119.

The user 116 may further hold a remote control unit 128 for controlling the multimedia source system (such as multimedia source device 110 and/or the sound processing electronics 108). The remote control unit 128 may be in communication with the multimedia system via conventional communication link including but not limited to infrared, optical, RF, Bluetooth, or Wi-Fi channels. The remote control unit 128 may be a dedicated control device or it may be a general purpose device installed with a remote control application, such as a smart phone. The remote control unit 128 may alternatively be an earpiece paired with a mobile device or a wearable device (such as smart glasses, a smart watch, and a smart wristband) that is conveniently with the user, is close to the ear of the user, and may be capable of accepting voice command from the user. The remote control unit is herein interchangeably referred to as remote control or remote control device.

A typical human ear, such as that of the user 116, can separate or resolve acoustic audio that is apart in time longer than 100 ms. This threshold time period, T, herein interchangeably referred to as the sound resolution time period, varies from individual to individual. It may be as short as 50 ms for someone with sensitive ears and as long as several hundred milliseconds for others. For illustrative purposes, T is assumed to be 100 ms. But for all the embodiment of this disclosure, the user may be provided an setup interface to change this parameter. A sound wave is a longitudinal compression pressure wave and travels at approximately 340 meters per second in air under normal pressure and temperature. Thus, sound travels about 34 meters within the presumed 100 ms sound resolution time period T of the human ear. Consequently, unsuppressed reflection of sound may become resolvable and detectable as echoes when the reflection paths are more than 34 meters longer than the direct path 120. For a small room, sound wave may need to travel a path with multiple reflections to become echoes that are resolvable in time. Multi-reflection paths, however, tend to damp (due to reflecting loss and diverging sound wave via longer path) the amplitude of the reflected sound wave to an undetectable level in intensity or to a level that is masked by non-echo sound. For a large room, such as one with a size comparable to or larger than 17 meters (assuming that an echo wave takes approximately a round trip before reaching a person and assuming that the person is close to the speaker producing the sound), audible echoes of a sound may be produced by a path involving only one or two reflections and thus still relatively loud (such as the path 122-126 shown in FIG. 1). In FIG. 1, the same sound may reach the user 116 via path 120, 122, or 124. If, for example, the path 122 is longer than path 120 by more than 34 meters, and the reflected sound through the path 122 is sufficient loud, echo from path 122 becomes resolvable in time and detectable in intensity by human ears. Those of ordinary skill in the art understand the definitive paths 122 and 124 are shown only for illustrative purposes. Other reflection paths may exist.

In one implementation, whether echoes are loud enough and thus need to be suppressed may be based on relative intensity of the echoes. Specifically, at each particular time, the desired sound is accompanied by echoes from earlier time. If the intended sound is much louder than and thus mask the echoes, there may be no need to suppress the echoes. A predetermined relative masking threshold representing the ratio between echo and currently intended sound (arriving to human ear at the same time), e.g., 1%, may be used to control whether echo suppression needs to be invoked. Alternatively and for simplicity, if the relative measured intensity (sound pressure) ratio between a later echo and its earlier intended sound is below a threshold, e.g., 1%, echo suppression may not be necessary. Alternatively, the measured sound intensities (sound pressure) may be converted to perceived loudness (according to the equal-loudness curves in FIG. 7, which will be described in more detail below). If the perceived loudness ratio between the later echo and its earlier intended sound is below a threshold, e.g., 1%, echo suppression may not be necessary.

Figure 7:
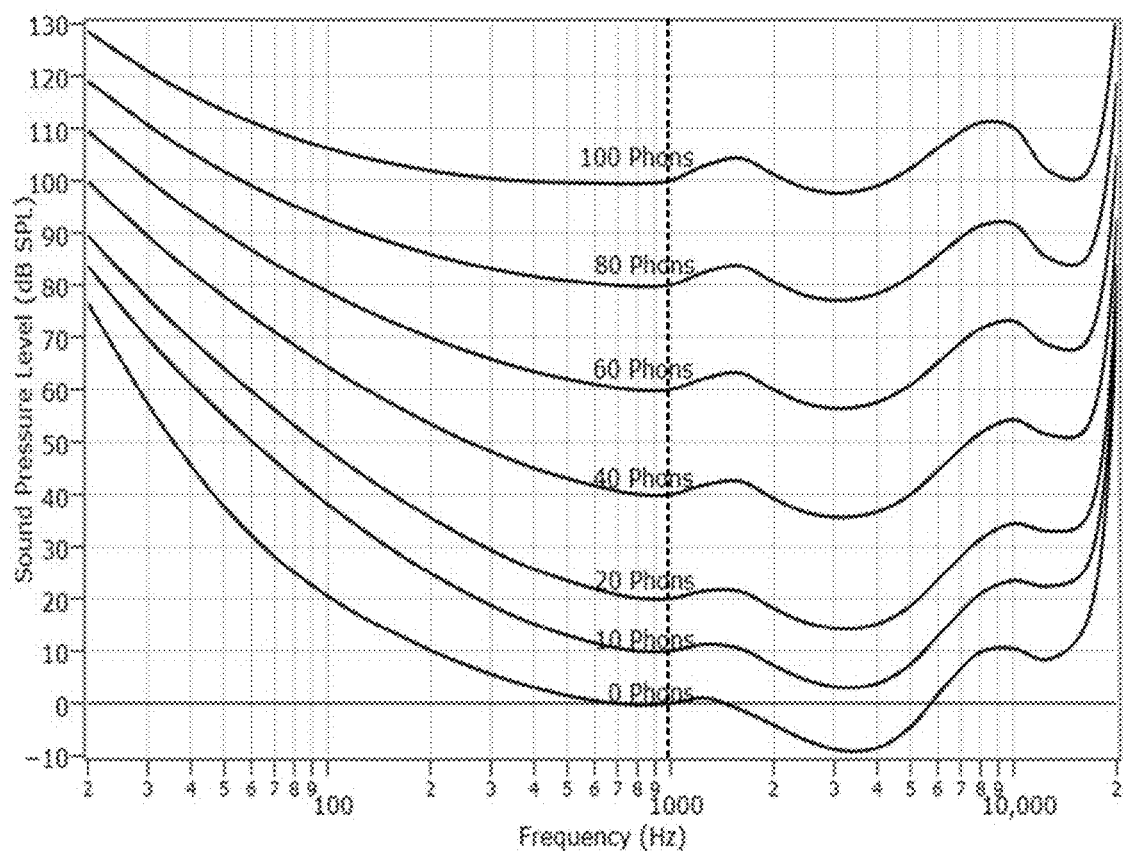
FIG. 7 shows the equal loudness contour curves for human ears.

In another implementation, whether the echoes are sufficiently loud and need to be suppressed depends on whether the echoes are considered audible in absolute sense. In some implementation, an echo may be considered audible and thus be suppressed if the absolute sound pressure of the echo is above a threshold. Alternatively, an echo may be considered audible and thus suppressed if its perceived loudness (rather than sound pressure) is above a predetermined perceived intensity threshold with reference to FIG. 7. FIG. 7 shows the equal loudness contour curves known in the art. In particular, FIG. 7 shows the equal loudness contour curves adopted in ISO (International Standard Organization) 226 standard. The vertical axis shows measured sound pressure in dB and each curve corresponds to a perceived sound pressure by a typical human ear as labeled. The perceived sound pressure and measured physical sound pressure are referenced at 1000 Hz. In other words, at 1000 Hz, each curve of FIG. 7 should have a vertical coordinate that matches the label therein (see the dashed line in FIG. 7). For a chosen perceived intensity threshold, e.g., 10 Phons, the actual corresponding physical intensity threshold in dB is a frequency dependent curve, such as the one labeled as 10 Phons in FIG. 7. Thus, whether echoes is considered to be loud enough to be heard and thus may need to be suppressed can be determined in frequency domain and at each frequency according to the human ear sensitivity as reflected in FIG. 7. The curves in FIG. 7 are the ones adapted by ISO. Alternatively, other similar experimental determined curves, such as the original Fletcher-Munson curves known in the art may be relied on instead. In some other implementation, an average threshold across the most sensitive frequency range of human ear, e.g., 200 to 7000 Hz, may be used as a single intensity threshold in determining whether echoes are loud enough to be in need of suppression.

Figure 2:
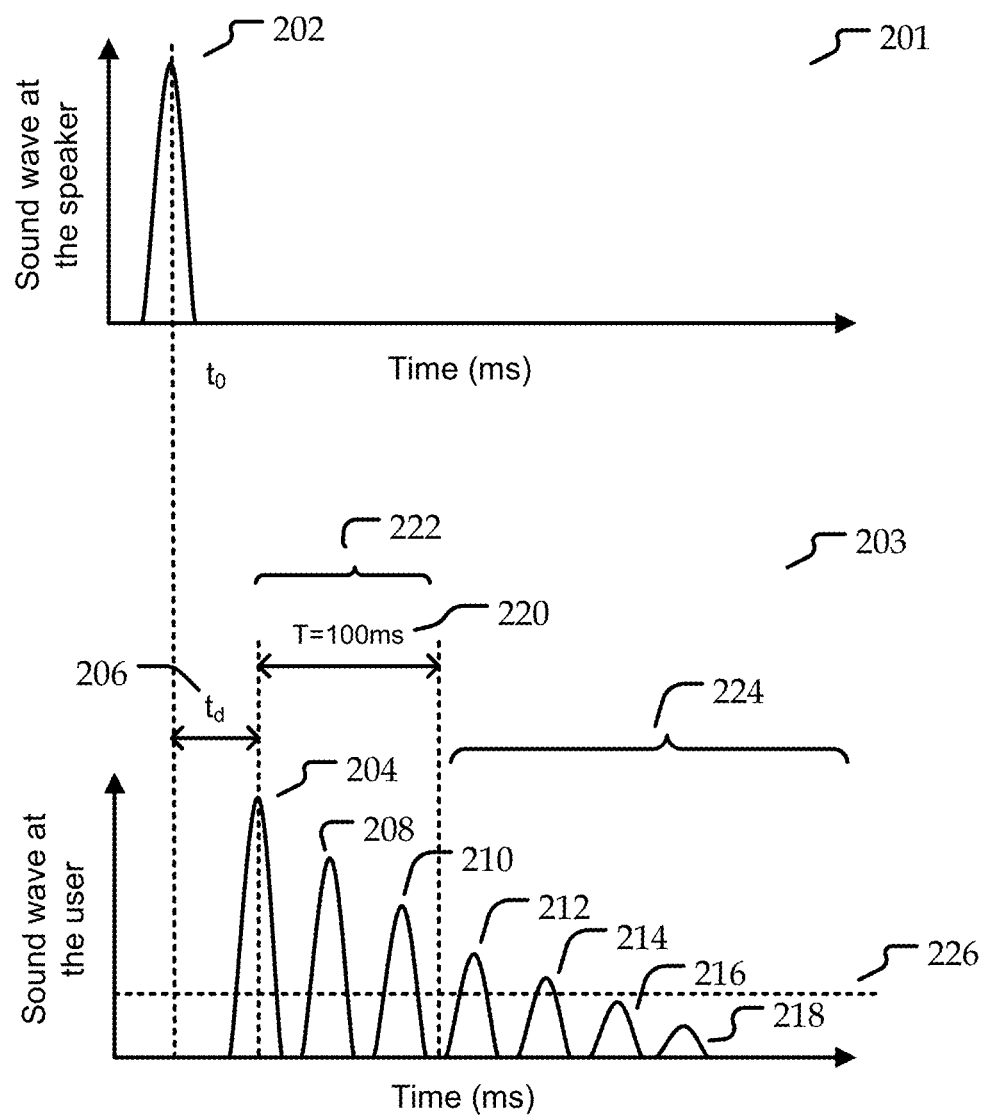
FIG. 2 illustrates an acoustic pulse from the speaker of 106 in FIG. 1 arriving at location 118 of FIG. 1 via direct and various reflective acoustic paths.

Returning to the reflective paths of sound in a room, FIG. 2 illustrates the timing of a sound wave packet, herein referred to as a sound pulse, emitted from the speaker 106 (peak 202 in 201) and received by the user at location 118 via direct and various reflective paths (peaks in 203). A sound pulse emitted by the speaker 106 at time $t_0$ is represented by peak 202. The emitted sound travels via direct path 120 of FIG. 1 and may be detected by the user after a time delay of $t_d$ 206 as direct peak 204. The time delay $t_d$ represents the time that the sound pulse takes to travel from the speaker to the user at location 118 without any reflection. The peaks 208, 210, 212, 214, 216, and 218 represent sound pulses detected by the user as a result of paths involving reflections and are herein referred as reflective peaks.

Among these reflective peaks, peak 208 and 210 (collective indicated by 222) are within a time delay of the 100 ms threshold time period T from the direct peak 204, as illustrated by 220. These may be referred to as early reflections. They are not resolved and thus undetectable by the user as echoes and are generally considered as beneficial reflections. They help increase the total volume of sound and add naturalness and fullness to the perceived sound. Without these early state reflections, the room would sound like an anechoic chamber and unnatural. Thus, it is beneficial to keep these early reflections.

The reflection peaks that are delayed more than the threshold time period T, such as peaks 212, 214, 216, and 218 of FIG. 2, collectively indicated by 224 and herein also referred as late stage reflections, would be perceived as echoes. In most situations, these echoes decrease the perceived audio quality. Reverberation effects in music are typically already part of the original audio signal from the multimedia source device 110 or may be added in the sound processing electronics 108. For example, the multimedia device or the sound processing electronics may offer modes such as "concert hall" and other modes. The echoes added by the room not architected for sound reverberation would most likely render the sound unnatural. Thus, it is desirable to suppress these late stage reflections.

Echoes from a reflective path having a damping effect that is above a damping threshold, or reflectivity that is below a reflectivity threshold (reflectivity is the opposite of damping and is defined below), with the reflectivity threshold represented by 226 of FIG. 2, may not need to be suppressed because these echoes tend to be weak. Threshold 226 of FIG. 2 is only for illustrative purposes. As described previously, the threshold 226 may be a threshold of sound pressure ratio between the echo peaks and the direct peak 204. Alternatively, threshold 226 may be a threshold of perceived loudness between the echo peaks and the direct peak 204. Here, the term reflectivity include all the damping effect for a sound wave in the reflective path, including the reflection loss at various reflection points as well as damping of sound caused due to the diverging sound pass though longer path length compared with the direct path. The reflectivity of an echo path is thus conveniently calculated by taking the ratio of intensity of the corresponding echo peak and the direct peak in FIG. 2. In the example shown in 203 of FIG. 2, the echoes 216 and 218 may fall below the reflectivity threshold and thus there may be no need to suppress them. The echoes 212 and 214 however, are above the reflectivity threshold 226 and thus may need to be suppressed.

Figure 3:
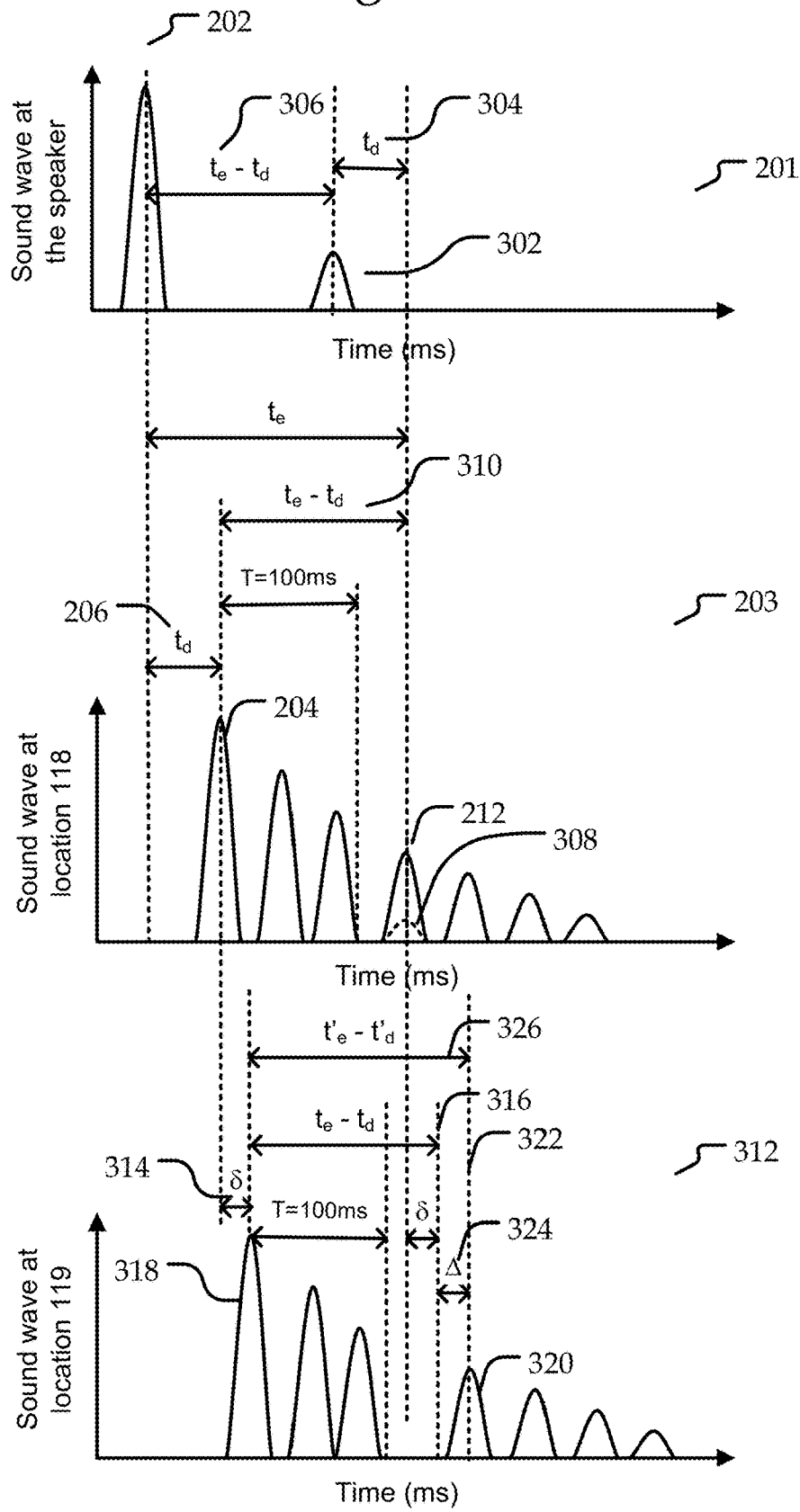
FIG. 3 illustrates an acoustic pulse from the speaker of 106 in FIG. 1 arriving at location 118 and location 119 of FIG. 1 via direct and various reflective acoustic paths.

Turning to FIG. 3, suppression of an echo, the peak 212 for example, may be achieved by emitting an echo suppression sound wave pulse 302 from the speaker. The echo suppression sound wave arriving at the user at location 118 via the direct path can be used to suppress the echo peak 212. In the simplest implementation, the secondary effect of echoes from the echo suppression sound wave pulse may be ignored although implementations that consider the secondary echo effects are contemplated based on the same principles discussed in this disclosure. Because it takes $t_d$ for any sound pulse to arrive from the speaker to the user at location 118 via the direct path, the echo suppression sound pulse 302 for echo peak 212 generated at the speaker is ahead of the echo peak 212 by $t_d$, as illustrated by 304.

The amplitude of the echo suppression pulse 302 at the speaker is determined such that its amplitude upon arriving at the user via the direct path is comparable to the amplitude of the echo peak 212. The phase of pulse 302, however, is adjusted such that it is substantially out of phase with the sound oscillation in the echo peak 212. As such, the echo suppression pulse may substantially cancel the echo 212 at the user location 118 by the principle of sound wave interference. Referring to 306 of FIG. 3, the echo suppression pulse for the echo peak 212 is emitted by the speaker at a time $t_e$-$t_d$ following the initial sound pulse 202. The destructive interference of the sound wave 212 and 302 at the user's location leads to suppression of the echo 212 and reduce it to zero or smaller amplitude, as shown by 308 of FIG. 3. Those of ordinary skilled in the art understand that because the phase of each frequency component of the sound pulse experience different phases, the phase of the echo suppression pulse may need to be calculated in frequency domain for each frequency component and the echo-suppression pulse may then be generated accordingly.

Sound wave is compression wave. The echo suppression sound from the direct path 120 and the echo sound 212 from some reflective path may not be air compressions along the same direction at the location 118 where the user is. However, both waves are collected by an ear and then guided by the ear tube or tunnel to the ear drum. Thus, the two sound waves are effectively converted into a sound interference in a single direction at the ear drum, reducing the complexity in determining the parameters associated with the echo suppression sound.

The discussion above focuses on suppression the echo peak 212. Other late stage echoes above the detectable threshold 226, such as one or more of 214, 216, and 218 may be suppressed in a similar way by additional echo suppression pulses from the speaker.

Different locations in the room require different echo suppression sound waves. This is illustrated by 312 of FIG. 3 for sound wave received at location 119 rather than location 118 of the room 102 in FIG. 1. The location 119 may be, for example, further away from the speaker, and thus the direct sound pulse 202 may arrive at location 119 by a further delay δ compared to the location of 118, as illustrated by 314. Thus, the echo suppression pulse 302 designed for location 118 arrives at location 119 at time indicated by 316. Because the echo paths of location 119 are different from those of location 118, the first echo peak for location 119 (outside T=100 ms from the direct path peak 318), 320, may not coincide with time 316, but with time 322 instead. Thus the echo suppression pulse 302 designed for location 118 may arrive for example, ahead of the first echo peak 320 by Δ, as indicated by 324. While the suppression of echo 320 by pulse 302 may be signed to effectively suppressed echo 212 at location 118, the suppression of echoes at location 119 may not be satisfactory. But if Δ is sufficiently small, the suppression pulse 302 may be used to simultaneously suppress 212 and 320 to some extent. Alternatively, the suppression pulse 302 may be adjusted in time and amplitude so as to achieve a maximum overall suppression of 212 and 320.

For a particular location, such as 118 of FIG. 1, a set of echo suppression parameters may be determined in order to generate the suppression pulse 302 with appropriate amplitude, timing, and phase to suppress echo 212. For example, the set of echo suppression parameters may include the amplitude of the echo peak 212 relative to the direct sound 204, conveniently represented by a path reflectivity r, as defined previously, and the time delay between the echo peak 212 and the direct peak 204, $t_e-t_d$, as shown by 310 of FIG. 3. The time delay, $t_e-t_d$, is important for setting the timing of the echo suppression pulse 302. It is also important for setting the phase of the echo suppression pulse 302 since the echo suppression is based on suppressing an echo from a reflective path using an echo suppression wave from the direct path and the two paths are different in path length and are thus different in sound phase lapse.

Figure 4:
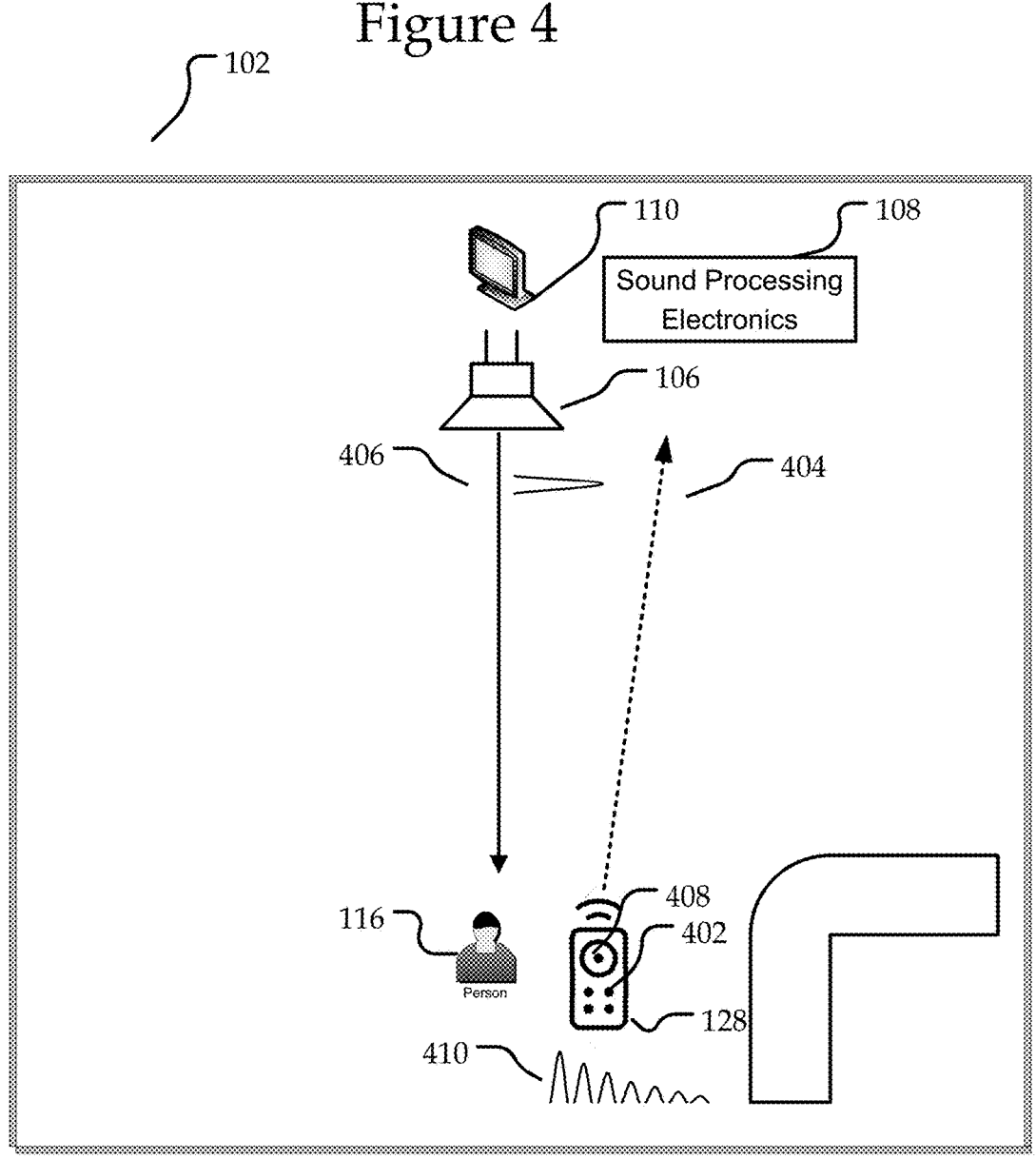
FIG. 4 illustrates a setup for an exemplary echo suppression calibration process.

FIG. 4 illustrates an embodiment for measuring this exemplary set of parameters in an echo suppression calibration process with help from the remote control unit 128. Specifically, the remote control 128 in communication with the sound processing electronics 108 and/or multimedia source device 118 (together with the speaker 106, collective referred to as the multimedia system) is employed to measure the set of parameters and communicate them to the multimedia system.

The remote control unit 128 includes a user interface 402 for receiving instruction from user 116 for initiating an echo suppression calibration process. The user interface 402 may be a button, a touch icon on a touch screen, or any other means for user input. Alternatively, the user input may be taken via voice commands based on speech recognition. Upon receiving the input, e.g., when a button 402 is pressed by the user, an echo suppressing request message may be sent to the multimedia system via a communication link 404 between the remote control unit 128 and multimedia system. Upon receiving the request, the multimedia system then generates an acoustic pulse 406. Alternatively, the multimedia system may directly receive request form the user, by for example, detecting user voice command from the user. For another example, the user may press a button on the multimedia system and then move location 118 before the acoustic pulse 406 is generated by the multimedia system.

Direct pulse and reflective pulses of 406 are detected by a microphone 408 in the remote control unit. The detected signal 410 is analyzed by the remote control unit to generate the set of echo suppression parameters for echo peak 212. The echo suppression parameters are then communicated to the multimedia system via the communication link 404. For more accurate measurement of the echo suppression parameters, particularly for high frequency and short wavelength sound, it may be desirable for the user to place the remote control unit close to her ears when detecting the sound pulse 406 directly and via reflective paths.

Those of ordinary skilled in the art understand that rather than processing the detected signal 410 and obtaining the echo suppression parameters by the remote control unit, the detected signal may be simply digitized and transmitted by the remote control unit to the multimedia system via the communication link 404. The signal may be subsequently analyzed by the multimedia system to obtain the echo suppression parameters. As such, processing requirement is shifted to the multimedia system from the remote control unit. For simplicity and without losing generality, the embodiments below focus on keeping the signal processing for generating the echo suppression parameters in the remote control unit.

Figure 5:
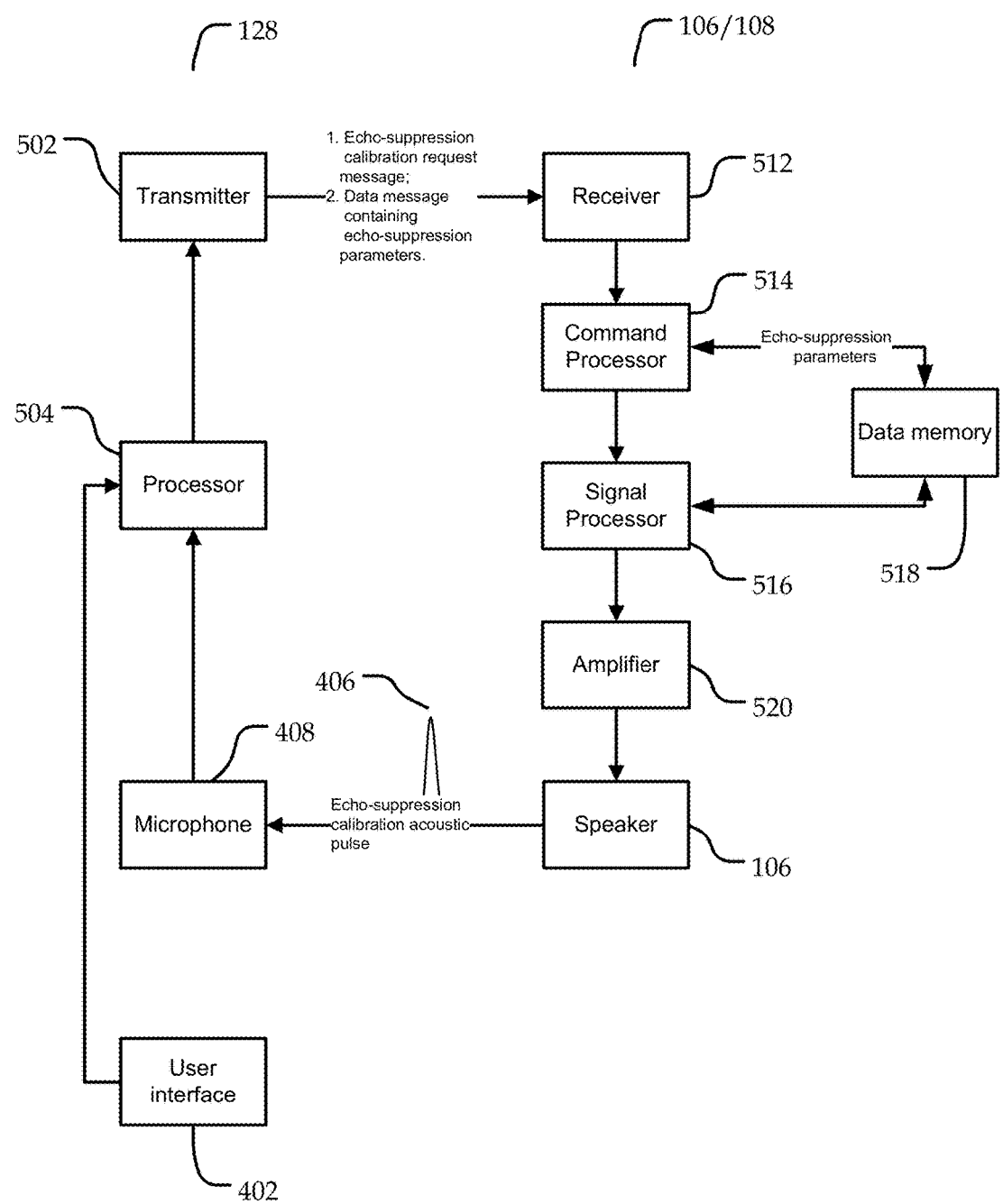
FIG. 5 is both a block diagram and flow chart for an exemplary echo suppression calibration process of a multimedia system using a remote control unit.

FIG. 5 shows various components of the remote control unit 128 and the multimedia system 106/108 and detailed data flow for the echo suppression calibration process. Specifically, the remote unit may comprise a transmitter 502, a processor 504, a microphone 408, and a user interface 402. The multimedia system may comprise a receiver 512, a command processor 514, a signal processor 516, a data memory 518, an audio amplifier 520, and a speaker 106.

The processor of the remote unit 128 is configured to process the user request via the user interface 402 and generate an echo suppression request message in a predefined format with necessary fields. One of the fields, for example, may be used to identify the remote control unit. The request message is sent to the receiver 512 of the multimedia system. The received request message is processed by the command processor 514 of the multimedia system. The signal processor 516 is then instructed to generate an acoustic pulse signal having a duration that is less than T, the threshold time for human ears. The pulse duration is preferably much smaller than T for improving the accuracy of the calibration process. The oscillation frequency of the acoustic wave may be but is not limited to 250 Hz. Because the pulse duration is less than T, it will hardly be hearable and disturbing to the user even though it is in the audible frequency range. By using pulses that is in the audible frequency range, no special microphone is needed in the remote control unit. In some implementation, the time delay and reflectivity measurement procedure described herein may be performed multiple times separately but as a series using acoustic pulses at various audible frequency to achieve more accurate measurement of reflectivity at different frequencies. In some implementation, the oscillation of the acoustic wave may be set to a frequency that is not audible for human ears. To the extent that the damping of the inaudible acoustic wave via reflection and through the air differs from the audible sound, predetermined calibration may be made for the measured reflectivity. The acoustic pulse signal is then input into the audio amplifier 520 and the amplified pulse signal is used to drive the speaker 106 for generating the acoustic pulse 406.

The acoustic pulse reaches the microphone 408 of the remote control unit via direct and reflective paths and is detected by the microphone 408. The remote control may maintain a predetermined timeout period in, e.g., its non-volatile memory. Such a timeout period, may be, e.g., 50 seconds. If no acoustic pulses are detected by the microphone 408 within the predetermined timeout period, the echo suppression calibration process simply aborts. Thus, the generation of the acoustic pulse by the speaker of the multimedia system is preferably completed within the predetermined timeout period following the transmission of the echo suppression request message by the transmitter 502 of the remote control unit 128.

The signal generated by the microphone 408 from detecting the acoustic pulse 406 via direct and reflective paths may be of the waveform illustrated by the waveform 203 of FIG. 2 and FIG. 3. The signal is analyzed by the processor 504. Specifically, the processor identifies main peaks in the signal, including the primary peak 204, and other peaks such as 208, 210, 212, 214, 216, and 218. The processor will particularly identify the primary peak 204 from direct path and the earliest peak outside the window of T after the primary peak 204 as the echo peak 212 (referring to FIG. 3). The processor 504 thus derives the time delay of the echo $t_e - t_d$. Further, the processor 504 compares the intensity or amplitude or sound pressure of the echo peak 212 and the primary peak 204 to obtain the ratio r representing the reflectivity of the reflective path of echo 212.

These two parameters, $t_e - t_d$ and r, are then incorporated into a data message by the processor 504 of the remote control unit. The data message is then sent by the transmitter 502 of the remote control unit. The data message is associated with the initial echo suppression request message by, for example, linking IDs, indicating that the two messages belongs to the same calibration task. The data message is received by the receiver 512 of the multimedia system and analyzed by the command processor 514. The command processor extracts the set of at least two parameters from the data message and stores the two parameters in data memory 518 of the multimedia system and the echo suppression calibration process ends. The memory 518 may be any type of volatile or nonvolatile memory, including but not limited to flash memory, static random access memory, a magnetic memory, and a magnetic or optical disk.

As discussed previously, those of ordinary skilled in the art understand that rather than processing the detected signal for the echo suppression calibration acoustic pulse 406 and obtaining the echo suppression parameters by the remote control unit, the detected signal may be simply digitized by processor 504 and transmitted by transmitter 502 by the remote control unit as the data message to the multimedia system. The digitized signal may be subsequently analyzed by the processors of the multimedia system to obtain the echo suppression parameters.

Further, those or ordinary skill in the art understand that the data message may include multiple sets of echo suppression parameters rather an a single set, each set corresponding to the echo suppression parameters for one echo peak among multiple echo peaks.

The process above measures and determines $t_e - t_d$ and r for one location of the remote control unit, such as the location 118 of FIG. 1. In some situations, the user may move around the room from time to time. Thus, it is preferable that the calibration process described above be performed from time to time when requested by the user as she moves from location to location. The request may be made by invoking the user interface 402 at any time when needed as long as the time difference between invoking two successive calibration procedures is larger than the predetermined timeout period so that the remote control unit would treat the successive calibration process as separate independent procedures.

In an alternative implementation, the remote control unit 128 may be configured to automatically initiate echo-suppression calibration procedure with the multimedia system.

The calibration procedure may be carried out periodically in anticipation of frequent user movement from one location in the room to another location in the room. For example, a wearable device as a remote control may be with the user all the time and thus accurately reflect where the user is in the room in real-time. In another alternative implementation, the remote control unit 128 may initiate echo-calibration procedure only when there is a large user movement. For example, the remote control unit such as a wearable device may further include a motion sensor that monitors its movement. Movement beyond a predetermined distance indicates that the user has significantly changed her location and the remote control unit 128 may thus automatically initiate a calibration procedure as described above. Further, the multimedia system rather than the remote control may be equipped with sensors to detect human movement in the room and alert the user to start a calibration procedure. In some situation, the multimedia system may be in the midst of producing audio when such large movement is detected and it may not be convenient to temporarily stop the current audio rendering and carry out the echo-suppression calibration procedure. Thus, in some other implementation, rather than initiating the calibration procedure immediately following detection of user movement beyond the predetermined distance, the remote control unit 128 may be switched into a monitoring state (using its microphone 408, for example) and waiting for a silence span in the audio rendered by the multimedia system for initiating the calibration procedure.

In some other situations, the user may desire to suppress echoes simultaneously at different locations. For example, the user may desire to suppress echoes at location 119 in addition to location 118 of FIG. 1 such that two person one siting at location 118 and another siting at location 119 may both experience reduced echoes. For the reasons discussed above with respect to 203 and 312 of FIG. 3, echo at both locations may only be suppressed to some extent. In one implementation, the system of FIG. 5 may provide capability to support simultaneous echo suppression in multiple locations. Specifically and after determining $t_e - t_d$ and r for location 118 as described above, the remote control unit 128 may be configured to prompt the user to move the remote control unit to another desired location, e.g., location 119, within a single calibration procedure, and the entire process described above may be repeated, and a set of delay and reflectivity parameters, denoted by $t'_e - t'_d$ and r' for location 119 may be measured by the remote control unit 128 and stored in the data memory 518 of the multimedia system. In FIG. 3, the element 326 illustrates $t'_e - t'_d$. The two sets of delay and reflectivity parameters (one for location 118 and the other for location 119) may be combined by the processors of the multimedia system into a single set of parameter to be used for echo suppression. For example, the two reflectivity parameters (r) may be averaged into a single reflectivity parameter. If $\Delta$ in 312 of FIG. 3 if small compared to T, the two delay parameters $(t_e - t_d)$ may also be averaged into one delay parameter. As shown in FIG. 3, $\Delta$ is a measure of difference between echo delays for location 118 and 119. If $\Delta$ is relatively large, then the suppression of echo at location 118 and 119 may not be simultaneously achieved and the processors of the multimedia system of FIG. 5 may choose the set of parameters of one of the locations as the combined single set of parameter for echo suppression.

Figure 6:
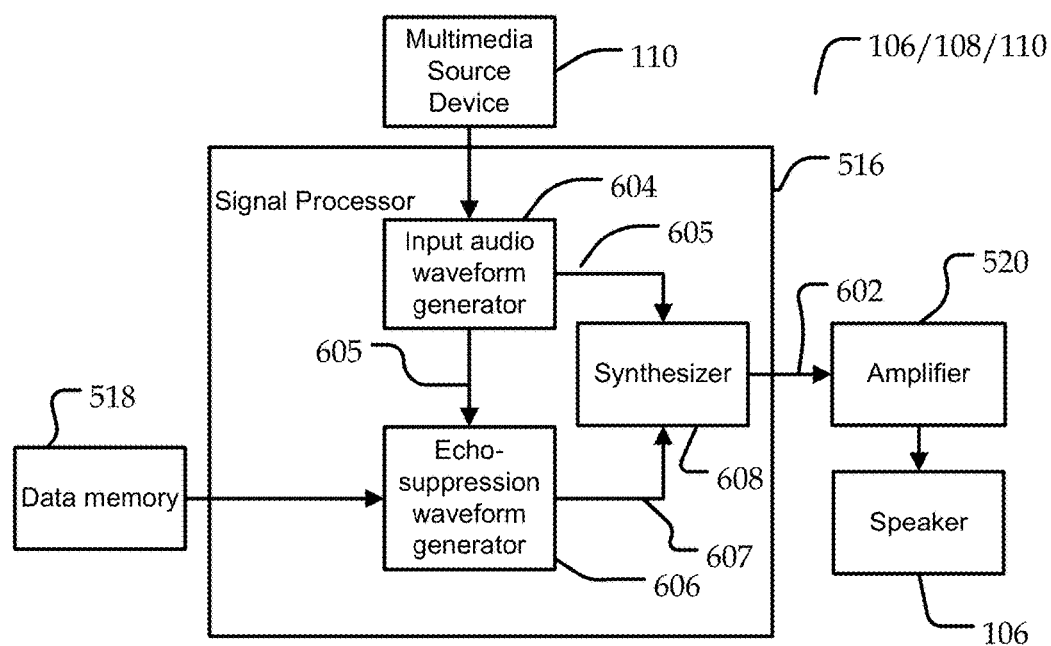
FIG. 6 is a block diagram of the multimedia system for generating echo suppressed audio.

Once the time delay and amplitude for the echo suppression is determined by the processor 516 and stored in data memory 518, the multimedia system may then use these parameters to process an input audio signal to include echo suppression. FIG. 6 illustrates an exemplary embodiment having various components within the signal processor 516 for generating processed audio signal 602 which may be amplified by the amplifier 520 for driving the speaker 106. These components may be implemented as dedicated hardware module in the signal processor. They may alternatively be implemented as software modules that run in the signal processor.

The waveform 605 for the input audio signal may be generated by the waveform generator 604. An echo waveform corresponds to the input audio waveform amplitude-adjusted and delayed by the difference between the echo path and direct path. The echo cancelling wave 607 is consequently a time-delayed, amplitude-adjusted, and phase-shifted version of the input audio waveform. Thus the echo suppression waveform generator 606 takes the input audio waveform 605 and the parameters $t_e-t_d$ and r from the data memory 518 and generates the echo suppression waveform 607. The input audio waveform 605 and the echo suppression waveform 607 are combined by synthesizer 608 to generate the processed audio signal 602, which is subsequently amplified by the amplifier 520 and rendered to the user by the speaker 106.

The synthesis of the processed audio signal 620 may be a simple addition of the input audio signal waveform 605 and the echo suppression waveform. The synthesis may alternatively be carried out in frequency domain. Suppression of multiple echoes may be achieved based on the same principle shown in FIG. 6 with the echo suppression waveform generator taking multiple sets of echo suppression parameters rather than a single set for generating the echo suppression waveform 607.

In FIG. 6, the synthesizer 608 may first determine whether a particular echo path needs to be suppressed and may decide not to include echo suppression for that particular echo path in the synthesized waveform if it is weak. For example, as shown by 226 in FIG. 2, if the damping of the sound pressure of an echo path is above the damping threshold value, such as echoes 216 and 218, suppression for that echo may not need to be included in the synthesized waveform. Further, calculation for echo suppression waveforms for these weak echoes may be omitted or skipped in the echo suppression waveform generator 606. Alternatively, the synthesizer 608 may determine at each time or time segment whether the absolute intensity (sound pressure) or perceived intensity (loudness) of the echo is below respective threshold levels as discussed above. If for a particular time segment the intensity of the echo is below the threshold, then echo suppression for that time segment may not need to be included in the synthesized waveform 602. The intensity (either sound pressure or loudness) of the echo is basically the corresponding intensity of the input audio with appropriate time shift and adjusted amplitude considering the damping of the echo path.

In FIG. 6, both the echo suppression waveform generator 606 and the synthesizer 608 may operate in frequency domain, particularly to ensure that the phase of the echo suppression wave is set such that the echo suppression wave will correctly cancel the echo it intend to suppress in most frequencies. The phases needed for echo suppression for various frequency components of the echo, particularly within the range where human ear is sensitive, are different because the length difference between the direct and echo paths gives rise to different phase lapse for different frequency components of sound. Those skilled in the art understand that the correct phase can be set in frequency domain for various frequency components as long as the path length difference between the echo path and direct path is known. In the embodiments disclosed above, this path difference is known from the measured time delay $t_e-t_d$ for each echo.

It has been assumed in the embodiments above that the phase lapse of the reflective sound wave forming the echoes is only from the corresponding path length and there is no unknown phase change at the reflection points. To the extent that such phase change exists, the embodiments above may be modified to include a learning process in which multiple measurements may be made and the phase adjustment by the synthesizer 608 may be set to achieve best echo suppression either by user feedback or machine feedback.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A method for echo suppression in an audio system, comprising:
   receiving, by the audio system, a first echo suppression request message sent by a remote electronic device at a first location in response to receiving a echo suppression command by the remote electronic device;
   causing, by the audio system, a speaker to generate a first acoustic pulse within a first predetermined time period after receiving the first echo suppression request message, wherein the first acoustic pulse has a pulse width smaller than a first sound resolution time period and travels along a first direct path and a first set of one or more indirect paths to reach the remote electronic device at the first location;
   receiving, by the audio system, a first data message containing a first set of data associated with the first direct path and the first set of one or more indirect paths of the first acoustic pulse received by the remote electronic device at the first location, wherein the first set of data relates to sound reflections in an environment of the audio system to be used for echo suppression and corresponds to a first signal generated by a microphone disposed in the remote electronic device upon detecting the first acoustic pulse from the first direct path and from the first set of one or more indirect paths following the detection of the first acoustic pulse from the first direct path by the microphone;
   receiving, by the audio system, a second echo suppression request message from the remote electronic device at a second location within a predetermined timeout time period after receiving the first echo suppression request message;
   causing, by the audio system, the speaker to generate a second acoustic pulse after receiving the second echo suppression request message, wherein the second acoustic pulse has a pulse width smaller than the first sound resolution time period and travels along a second direct path and a second set of one or more indirect paths to reach the remote electronic device at the second location;

receiving, by the audio system, a second data message containing a second set of data associated with the second direct path and the second set of one of more indirect paths of the second acoustic pulse received by the remote electronic device at the second location, wherein the second set of data relates to sound reflections in the environment of the audio system to be used for echo suppression and corresponds to a second signal generate by the microphone upon detecting the second acoustic pulse from the second direct path and from the second set of one or more indirect paths;

obtaining, by the audio system, a third set of data derived from the first and second set of data wherein the third set of data includes parameters for a time adjustment, an amplitude adjustment, and a phase shift;

receiving, by the audio system, a primary audio signal from a multimedia source;

generating, by the audio system, an echo suppression audio signal by applying the third set of data to the primary audio signal, wherein the echo suppression audio signal is a time-delayed, amplitude-adjusted, and phase-shifted version of the primary audio signal;

synthesizing the primary audio signal and the echo suppression audio signal into an output audio signal; and rendering, by the audio system, the output audio signal to the speaker to generate sound based on the output audio signal.

2. The method of claim 1, wherein the first signal comprises a first primary peak associated with the first acoustic pulse detected by the microphone via the first direct path and a first set of one or more additional peaks each associated with the first acoustic pulse detected by the microphone via one of the first set of one or more indirect paths.

3. The method of claim 2, wherein the first set of data comprise a time delay and an intensity ratio between the first primary peak and the earliest peak of the first set of one or more additional peaks that are after the first primary peak by at least the first sound resolution time period.

4. The method of claim 3, wherein the first sound resolution time period is predetermined and is between 50 ms and 150 ms.

5. The method of claim 3, wherein the time adjustment is determined from the time delay, the amplitude adjustment is determined from the intensity ratio, and the phase shift is between 150 and 210 degrees.

6. The method of claim 2, wherein the first set of data is a digitized form of the first signal.

7. A method for echo suppression in a remote electronic device at a first location and in communication with a multimedia system, the method comprising:

sending, by the remote electronic device, a first echo suppression request message to the multimedia system to cause a speaker to generate a first acoustic pulse within a first predetermined time period after receiving the first echo suppression request message, wherein the first acoustic pulse has a pulse width smaller than a first sound resolution time period and travels along a first direct path and a first set of one or more indirect paths to reach the remote electronic device at the first location;

generating a first signal by a microphone disposed in the remote electronic device by detecting the first acoustic pulse from the first direct path and from the first set of one or more indirect paths following the detection by the microphone of the first acoustic pulse from the first direct path;

deriving by the remote electronic device a first set of data from the first signal associated with the first direct path and the first set of one or more indirect paths of the first acoustic pulse and related to sound reflections in an environment with the multimedia system and to be used for echo suppression;

upon prompting, by the remote electronic device, a user to move the remote electronic device to a second location:

receiving by the remote electronic device a second input from the user to initiate echo suppression calibration;

sending by the remote electronic device a second echo suppression request message to the multimedia system to cause the speaker to generate a second acoustic pulse within the first predetermined time period after sending the second echo suppression request message, wherein the second acoustic pulse has a pulse width smaller than the first sound resolution time period and travels along a second direct path and a second set of one or more indirect paths to reach the remote electronic device;

generating a second signal by the microphone in the remote electronic device by detecting the second acoustic pulse from the second direct path and from the second set of one or more indirect paths following the detection by the microphone of the second acoustic pulse from the second direct path; and deriving a second set of data from the second signal;

generating an echo suppression audio signal of a primary audio signal by applying the first set of data and second set of data to the primary audio signal, wherein the echo suppression audio signal is a time-delayed, amplitude-adjusted, and phase-shifted version of the primary audio signal;

synthesizing the primary audio signal and the echo suppression audio signal into an output audio signal; and sending the output audio signal to the multimedia system for rendering the output audio signal in the speaker.

8. The method of claim 7, wherein the first signal comprises a first primary peak associated with the first acoustic pulse detected by the microphone via the first direct path and a first set of one or more additional peaks each associated with the first acoustic pulse detected by the microphone via one of the first set of one or more indirect paths.

9. The method of claim 8, wherein the first set of data comprise a time delay and an intensity ratio between the first primary peak and the earliest peak of the first set of one or more additional peaks that are after the first primary peak by at least the first sound resolution time period.

10. The method of claim 9, wherein the first sound resolution time period is predetermined and is between 50 ms and 150 ms.

11. The method of claim 8, wherein the first set of data is a digitized form of the first signal.

* * * * *